United States Patent
Wu et al.

(10) Patent No.: US 11,575,496 B1
(45) Date of Patent: Feb. 7, 2023

(54) RETIMING CIRCUIT MODULE, SIGNAL TRANSMISSION SYSTEM AND SIGNAL TRANSMISSION METHOD

(71) Applicant: PHISON ELECTRONICS CORP., Miaoli (TW)

(72) Inventors: Jen-Chu Wu, New Taipei (TW); Ching-Jui Hsiao, Miaoli County (TW); Chun-Wei Chang, Nantou County (TW); Sheng-Wen Chen, Hsinchu County (TW); Ching-Chung Cheng, Taoyuan (TW)

(73) Assignee: PHISON ELECTRONICS CORP., Miaoli (TW)

( * ) Notice: Subject to any disclaimer, the term of this patent is extended or adjusted under 35 U.S.C. 154(b) by 0 days.

(21) Appl. No.: 17/547,241

(22) Filed: Dec. 10, 2021

(30) Foreign Application Priority Data

Nov. 12, 2021  (TW) ................................. 110142144

(51) Int. Cl.
  *H04L 7/04*  (2006.01)
  *H04L 7/00*  (2006.01)

(52) U.S. Cl.
  CPC .......... *H04L 7/0037* (2013.01); *H04L 7/0008* (2013.01)

(58) Field of Classification Search
  CPC . H04L 7/0037; H04L 7/0008; H04L 25/4917; H04L 7/041; H03F 3/505
  USPC ....... 375/362, 373, 375, 376, 346, 348, 349, 375/229–231
  See application file for complete search history.

(56) References Cited

U.S. PATENT DOCUMENTS

| | | | |
|---|---|---|---|
| 2007/0164802 A1* | 7/2007 | Rea .......................... | H03F 3/505 327/266 |
| 2009/0190690 A1* | 7/2009 | Kuwata ............... | H04L 25/4917 375/291 |
| 2015/0311907 A1 | 10/2015 | Wu et al. | |

(Continued)

FOREIGN PATENT DOCUMENTS

WO   2021147005   7/2021

OTHER PUBLICATIONS

"Office Action of China Counterpart Application", dated Nov. 2, 2022, p. 1-p. 13.

(Continued)

*Primary Examiner* — Phuong Phu
(74) *Attorney, Agent, or Firm* — JCIPRNET (57) ABSTRACT

A retiming circuit module, a signal transmission system and a signal transmission method are disclosed. The retiming circuit module includes a path control circuit and a multipath signal transmission circuit. The multipath signal transmission circuit includes a plurality of parallel signal transmission paths. The path control circuit is configured to control the multipath signal transmission circuit to perform signal transmission between an upstream device and a downstream device based on a first parallel signal transmission path in the parallel signal transmission paths during a period of a handshake operation performed between the upstream device and the downstream device. The path control circuit is further configured to control the multipath signal transmission circuit to perform the signal transmission based on a second parallel signal transmission path in the parallel signal transmission paths after the handshake operation is finished.

25 Claims, 4 Drawing Sheets

(56) References Cited

U.S. PATENT DOCUMENTS

2019/0385057 A1    12/2019  Litichever et al.
2021/0320783 A1*  10/2021  Masuda ................. H04L 7/041

OTHER PUBLICATIONS

"Office Action of Taiwan Counterpart Application", dated Sep. 21, 2022, p. 1-p. 7.

* cited by examiner

RETIMING CIRCUIT MODULE, SIGNAL TRANSMISSION SYSTEM AND SIGNAL TRANSMISSION METHOD

CROSS-REFERENCE TO RELATED APPLICATION

This application claims the priority benefit of Taiwan application serial no. 110142144, filed on Nov. 12, 2021. The entirety of the above-mentioned patent application is hereby incorporated by reference herein and made a part of this specification.

BACKGROUND

Technical Field

The invention relates to a signal transmission circuit, and particularly relates to a retiming circuit module, a signal transmission system and a signal transmission method.

Description of Related Art

As a signal transmission speed on a printed circuit board becomes faster and faster, attenuation of signals during a transmission process becomes more and more severe. Therefore, in actual practice, a retimer is often added between an upstream component and a downstream component to extend a signal transmission distance. However, although the signal transmission distance may be prolonged by adding the retimer to a parallel signal transmission path, it may accordingly increase a delay time of data transmission. Therefore, how to extend the signal transmission distance while reducing the signal transmission delay as much as possible is actually one of the issues that technicians in related fields are devoted to study.

SUMMARY

The invention is directed to a retiming circuit module, a signal transmission system and a signal transmission method, which are adapted to extend a signal transmission distance while reducing a signal transmission delay as much as possible.

An exemplary embodiment of the invention provides a retiming circuit module, which is adapted to execute signal transmission between an upstream device and a downstream device. The retiming circuit module includes a path control circuit and a multipath signal transmission circuit. The multipath signal transmission circuit is coupled to the path control circuit, and includes a plurality of parallel signal transmission paths. The path control circuit is configured to control the multipath signal transmission circuit to perform the signal transmission between the upstream device and the downstream device based on a first parallel signal transmission path in the plurality of parallel signal transmission paths during a period of a handshake operation performed between the upstream device and the downstream device. The path control circuit is further configured to control the multipath signal transmission circuit to perform the signal transmission between the upstream device and the downstream device based on a second parallel signal transmission path in the plurality of parallel signal transmission paths after the handshake operation is finished.

An exemplary embodiment of the invention further provides a signal transmission system, which includes an upstream device, a downstream device and a retiming circuit module. The retiming circuit module is coupled between the upstream device and the downstream device to perform signal transmission between the upstream device and the downstream device. The retiming circuit module includes a plurality of parallel signal transmission paths. The retiming circuit module is configured to perform the signal transmission between the upstream device and the downstream device based on a first parallel signal transmission path in the plurality of parallel signal transmission paths during a period of a handshake operation performed between the upstream device and the downstream device. The retiming circuit module is further configured to perform the signal transmission between the upstream device and the downstream device based on a second parallel signal transmission path in the plurality of parallel signal transmission paths after the handshake operation is finished.

An exemplary embodiment of the invention provides a signal transmission method, which is used in a retiming circuit module. The signal transmission method includes: performing signal transmission between an upstream device and a downstream device based on a first parallel signal transmission path in a plurality of parallel signal transmission paths of the retiming circuit module during a period of a handshake operation performed between the upstream device and the downstream device; and performing the signal transmission between the upstream device and the downstream device based on a second parallel signal transmission path in the plurality of parallel signal transmission paths after the handshake operation is finished.

Based on the above description, the retiming circuit module may perform signal transmission between the upstream device and the downstream device based on the first parallel signal transmission path in the plurality of parallel signal transmission paths during the period of the handshake operation between the upstream device and the downstream device. Moreover, after the handshake operation is finished, the retiming circuit module may perform the signal transmission based on the second parallel signal transmission path in the plurality of parallel signal transmission paths. In this way, the signal transmission delay may be reduced as much as possible while extending the signal transmission distance.

It should be understood, however, that this Summary may not contain all of the aspects and embodiments of the present invention, is not meant to be limiting or restrictive in any manner, and that the present invention as disclosed herein is and will be understood by those of ordinary skill in the art to encompass obvious improvements and modifications thereto.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

A plurality of exemplary embodiments are provided below to describe the invention, though the invention is not limited to the provided embodiments, and the provided embodiments may be suitably combined. A term "couple" used in the full text of the disclosure (including the claims) refers to any direct and indirect connections. For example, if a first device is described to be coupled to a second device, it is interpreted as that the first device is directly coupled to the second device, or the first device is indirectly coupled to the second device through other devices or connection means. Moreover, a term "signal" refers to at least a current, a voltage, a charge, a temperature, data, an electromagnetic wave or any other one or more signals.

Reference will now be made in detail to the exemplary embodiments of the invention, examples of which are illustrated in the accompanying drawings. Wherever possible, the same reference numbers are used in the drawings and the description to refer to the same or like parts.

Embodiments of the invention may comprise any one or more of the novel features described herein, including in the detailed description, and/or shown in the drawings. As used herein, "at least one," "one or more," and "and/or" are open-ended expressions that are both conjunctive and disjunctive in operation. For instance, each of the expressions "at least on of A, B and C," "at least one of A, B, or C," "one or more of A, B, and C," "one or more of A, B, or C," and "A, B, and/or C" means A alone, B alone, C alone, A and B together, A and C together, B and C together, or A, B and C together.

It is to be noted that the term "a" or "an" entity refers to one or more of that entity. As such, the terms "a" (or "an"), "one or more," and "at least one" can be used interchangeably herein.

Figure 1:
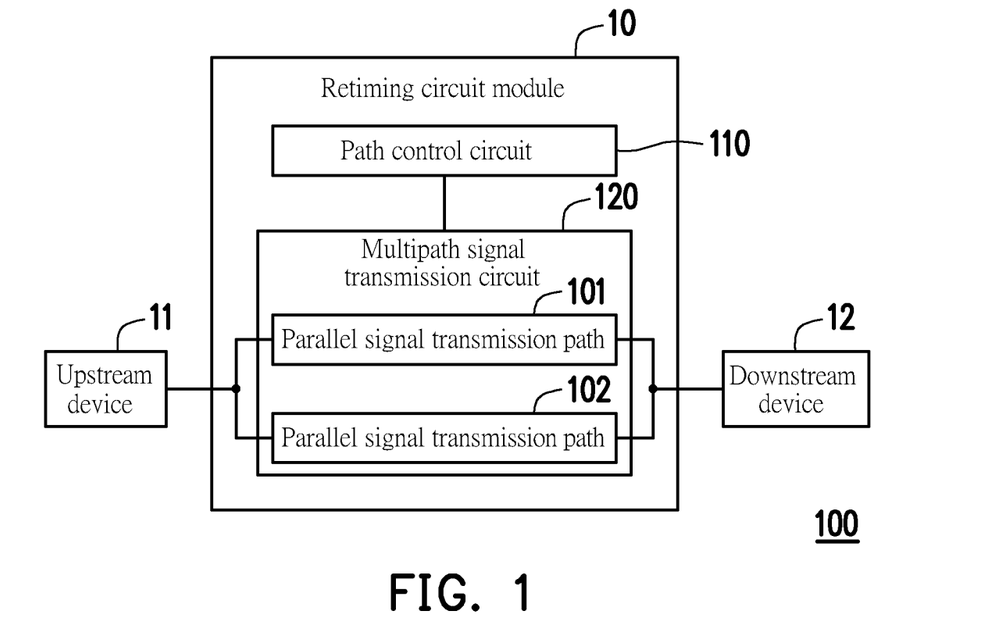
FIG. 1 is a schematic diagram of a signal transmission system according to an exemplary embodiment of the invention.

FIG. 1 is a schematic diagram of a signal transmission system according to an exemplary embodiment of the invention. Referring to FIG. 1, a signal transmission system 100 includes a retiming circuit module 10, an upstream device 11 and a downstream device 12. The retiming circuit module 10 is adapted to be coupled between the upstream device 11 and the downstream device 12 to perform signal transmission between the upstream device 11 and the downstream device 12 (i.e., to transmit signals received from the upstream device 11 to the downstream device 12, or transmit the signals received from the downstream device 12 to the upstream device 11). For example, the retiming circuit module 10 may include a retimer or a circuit module with a similar function. In addition, the upstream device 11 and the downstream device 12 may include any electronic components that support a signal transmission function.

In an exemplary embodiment, the retiming circuit module 10 may be used to perform signal processing such as signal buffering, signal resampling, signal serial to parallel (S2P) conversion, signal parallel to serial (P2S) conversion, signal content analysis, signal retransmission, etc., on signals transmitted between the upstream device 11 and the downstream device 12 to extend a signal transmission distance between the upstream device 11 and the downstream device 12. In addition, the retiming circuit module 10, the upstream device 11 and the downstream device 12 may be disposed on one or a plurality of circuit boards.

The retiming circuit module 10 may include a path control circuit 110 and a multipath signal transmission circuit 120. The path control circuit 110 is coupled to the multipath signal transmission circuit 120. The multipath signal transmission circuit 120 may include a parallel signal transmission path (which is also referred to as a first parallel signal transmission path) 101 and a parallel signal transmission path (which is also referred to as a second parallel signal transmission path) 102. The path control circuit 110 may instruct the multipath signal transmission circuit 120 to perform signal transmission between the upstream device 11 and the downstream device 12 based on one of the parallel signal transmission paths 101 and 102 at different time points.

In an exemplary embodiment, a handshake operation may be performed between the upstream device 11 and the downstream device 12. During the handshake operation, the upstream device 11 and the downstream device 12 may perform operations such as signal frequency change, clock alignment, and/or equalizer calibration, etc., through the retiming circuit module 10. In an exemplary embodiment, the handshake operation may be used to set (including calibrate) parameters of an equalizer of at least one of the upstream device 11 and the downstream device 12. During the handshake operation, the transmission of data signals between the upstream device 11 and the downstream device 12 may be suspended. After the handshake operation is finished, the upstream device 11 and the downstream device 12 may resume transmitting data signals based on an aligned clock and/or the calibrated equalizer.

In an exemplary embodiment, during the handshake operation between the upstream device 11 and the downstream device 12, the path control circuit 110 may control the multipath signal transmission circuit 120 to perform the signal transmission between the upstream device 11 and the downstream device 12 based on the parallel signal transmission path 101. After the handshake operation is finished, the path control circuit 110 may control the multipath signal transmission circuit 120 to perform the signal transmission between the upstream device 11 and the downstream device 12 based on the parallel signal transmission path 102.

In an exemplary embodiment, a total number of circuits (and/or circuit complexity) on the parallel signal transmission path 101 may be higher than a total number of circuits (and/or circuit complexity) on the parallel signal transmission path 102. Therefore, signal delay of the parallel signal transmission path 101 may be higher than signal delay of the parallel signal transmission path 102. In an exemplary embodiment, the signal delay of the parallel signal transmission path 101 is higher than the signal delay of the parallel signal transmission path 102, which means that a signal transmission speed of the signal transmission path 101 is lower than a signal transmission speed of the signal transmission path 102.

In an exemplary embodiment, the circuits on the parallel signal transmission path 101 may be used to analyze and adjust signals transmitted through the parallel signal transmission path 101. In an exemplary embodiment, the circuits on the parallel signal transmission path 102 may be used to buffer signals transmitted through the parallel signal transmission path 102, but cannot perform signal analysis and adjustment.

In an exemplary embodiment, the path control circuit 110 may detect start and end of the handshake operation performed between the upstream device 11 and the downstream device 12. For example, during a process of signal transmission between the upstream device 11 and the downstream device 12, the circuits on the parallel signal transmission path 101 may continuously analyze the signals transmitted through the retiming circuit module 10. The path control circuit 110 may detect the start and the end of the handshake operation according to a signal analysis result.

In an exemplary embodiment, after the handshake operation is started, the path control circuit 110 may instruct the multipath signal transmission circuit 120 to turn on the parallel signal transmission path 101. The turned-on parallel signal transmission path 101 may be used to transmit a handshake signal between the upstream device 11 and the downstream device 12 during an execution period of the handshake operation. The handshake signal carries information related to the handshake operation and may be used to perform the handshake operation. After the handshake operation is finished (for example, the signal frequency change, clock alignment, and/or equalizer calibration at a receiving end are completed), the path control circuit 110 may instruct the multipath signal transmission circuit 120 to switch to the parallel signal transmission path 102. The turned-on path control circuit 102 may be used to transmit data signals between the upstream device 11 and the downstream device 12 during a period when the handshake operation is not performed. In addition, other types of signals may also be transmitted between the upstream device 11 and the downstream device 12 during the period of executing the handshake operation or after the handshake operation is finished, which is not limited by the invention.

In an exemplary embodiment, the parallel signal transmission path 101 includes a plurality of parallel signal channels (which are also referred to as first parallel signal channels). The parallel signal transmission path 102 also includes a plurality of parallel signal channels (which are also referred to as second parallel signal channels). A total number of the first parallel signal channels may be the same or different from a total number of the second parallel signal channels.

In an exemplary embodiment, a frequency (which is also referred to as a clock frequency) of the signal transmitted through the parallel signal transmission path 101 is different from a frequency of the signal transmitted through the parallel signal transmission path 102. For example, the frequency of the signal transmitted through the parallel signal transmission path 102 may not be lower (for example, equal to or higher than) the frequency of the signal transmitted through the parallel signal transmission path 101.

Figure 2:
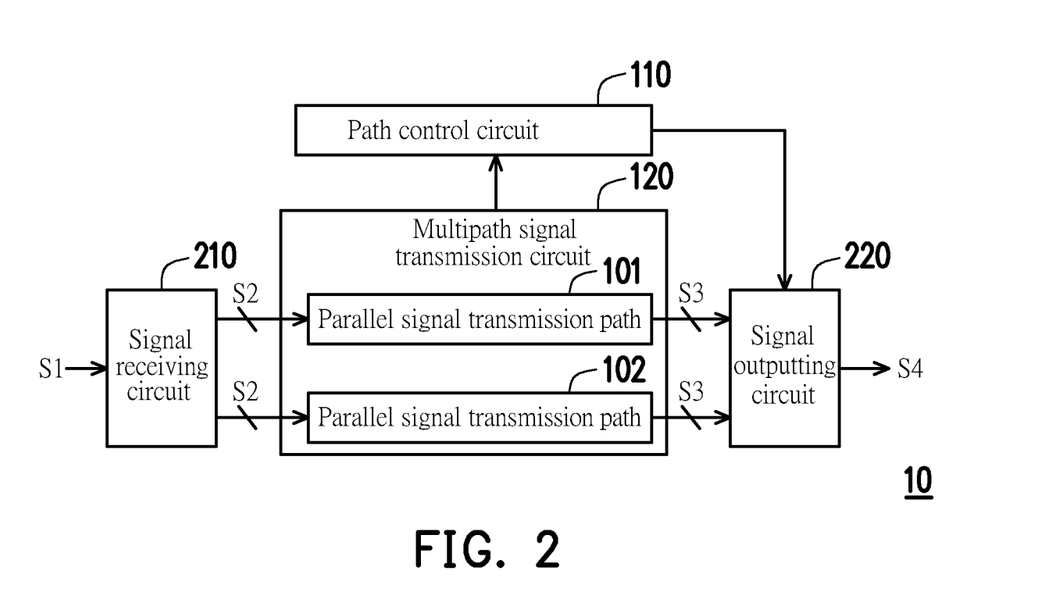
FIG. 2 is a schematic diagram of a retiming circuit module according to an exemplary embodiment of the invention.

FIG. 2 is a schematic diagram of a retiming circuit module according to an exemplary embodiment of the invention. Referring to FIG. 1 and FIG. 2, the retiming circuit module 10 may include the path control circuit 110, the multipath signal transmission circuit 120, a signal receiving circuit 210, and a signal output circuit 220. The signal receiving circuit 210 is coupled to an input terminal of the multipath signal transmission circuit 120. The signal output circuit 220 is coupled to an output terminal of the multipath signal transmission circuit 120.

The signal receiving circuit 210 may receive a signal (which is also referred to as a first signal) S1 and output a signal (which is also referred to as a second signal) S2. The signal S1 may include a signal sent by the upstream device 11 and intended to be transmitted to the downstream device 12, or a signal sent by the downstream device 12 and intended to be transmitted to the upstream device 11.

The path control circuit 110 may turn on one of the parallel signal transmission paths 101 and 102. The turned on parallel signal transmission path may be regarded as a target parallel signal transmission path. For example, the signal S2 may be transmitted in parallel to the target parallel signal transmission path (i.e., the parallel signal transmission path 101 or 102) in a multi-channel manner. For example, it is assumed that the target parallel signal transmission path is the parallel signal transmission path 101, the plurality of first parallel signal channels in the parallel signal transmission path 101 may be used to receive the signal S2 and output a signal S3. Alternatively, it is assumed that the target parallel signal transmission path is the parallel signal transmission path 102, the plurality of second parallel signal channels in the parallel signal transmission path 102 may be used to receive the signal S2 and output the signal S3.

In an exemplary embodiment, during the handshake operation performed between the upstream device 11 and the downstream device 12, the path control circuit 110 may turn on the parallel signal transmission path 101 to serve as the target parallel signal transmission path. At this time, the target parallel signal transmission path (i.e., the turned-on parallel signal transmission path 101) may be used to transmit the handshake signal. After the handshake operation is finished, the path control circuit 110 may switch to turn on the parallel signal transmission path 102 to serve as the target parallel signal transmission path. At this time, the target parallel signal transmission path (i.e., the turned-on parallel signal transmission path 102) may be used to transmit data signals.

The multipath signal transmission circuit 120 may receive the signal S2 from the signal receiving circuit 210 and output the signal (also which is referred to as the third signal) S3 based on the target parallel signal transmission path. For example, the signal S3 may be transmitted to the signal output circuit 220 in parallel in the multi-channel manner based on the target parallel signal transmission path (i.e., the parallel signal transmission path 101 or 102).

The signal output circuit 220 may receive the signal S3 from the multipath signal transmission circuit 120 and output a signal (which is also referred to as a fourth signal) S4. For example, if the signal S1 is sent by the upstream device 11, the signal S4 output according to the signal S1 may be transmitted to the downstream device 12. Alternatively, if the signal S1 is sent by the downstream device 12, the signal S4 output according to the signal S1 may be transmitted to the upstream device 11.

In an exemplary embodiment, a frequency of the signal S2 is lower than a frequency of the signal S1, and a frequency of the signal S4 is higher than a frequency of the signal S3. For example, the signal receiving circuit 210 may down-convert and shunt the signal S1 to generate the signal S2. For example, the signal output circuit 220 may up-convert and converge the signal S3 to generate the signal S4. The frequency of the signal S1 may be the same or different from the frequency of the signal S4. The frequency of the signal S2 may be the same or different from the frequency of the signal S3.

Figure 3:
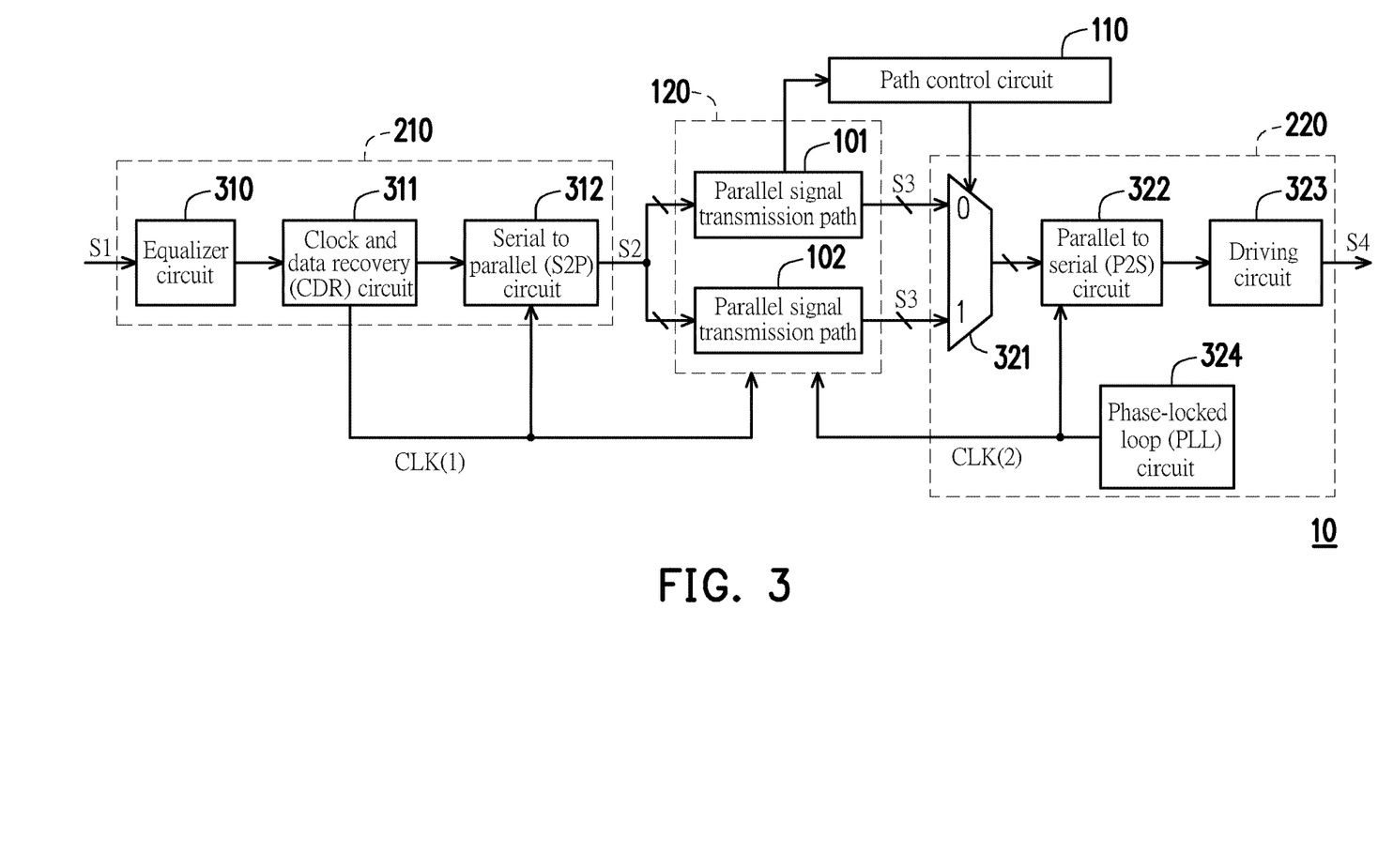
FIG. 3 is a schematic diagram of a retiming circuit module according to an exemplary embodiment of the invention.

FIG. 3 is a schematic diagram of a retiming circuit module according to an exemplary embodiment of the invention. Referring to FIG. 3, the signal receiving circuit 210 may include an equalizer circuit 310, a clock and data recovery (CDR) circuit 311, and a serial to parallel (S2P) circuit 312. An output terminal of the equalizer circuit 310 is coupled to an input terminal of the CDR circuit 311. An input terminal of the S2P circuit 312 is coupled to an output terminal of the CDR circuit 311. An output terminal of the S2P circuit 312 is coupled to an input terminal of the parallel signal transmission path 101 and an input terminal of the parallel signal transmission path 102.

The signal output circuit 220 includes a multiplexer circuit 321, a parallel to serial (P2S) circuit 322, a driving circuit 323, and a phase-locked loop (PLL) circuit 324. A first input terminal of the multiplexer circuit 321 is coupled to an output terminal of the parallel signal transmission path 101. A second input terminal of the multiplexer circuit 321 is coupled to an output terminal of the parallel signal transmission path 102. An output terminal of the multiplexer circuit 321 is coupled to an input terminal of the P2S circuit 322. An output terminal of the P2S circuit 322 is coupled to the driving circuit 323. The PLL circuit 324 is coupled to the P2S circuit 322.

An input terminal of the equalizer circuit 310 is used to receive the signal S1 and perform preliminary processing (such as signal amplification) on the signal S1. For example, the equalizer circuit 310 may include a continuous-time linear equalizer (CTLE) or other types of equalizers, which is not limited by the invention.

The CDR circuit 311 may receive the signal S1 via the equalizer circuit 310. The CDR circuit 311 and the S2P circuit 312 may sequentially perform sampling and speed down processing (i.e., frequency down-conversion) on the signal S1. For example, after the speed down processing of the CDR circuit 311 and the S2P circuit 312, the frequency of the signal S2 output by the S2P circuit 312 may be ¼, ⅛, ¹⁄₁₆ or ¹⁄₃₂ of the Original Frequency of the Signal S1. Thereafter, the signal S2 may be input to the target parallel signal transmission path (i.e., the parallel signal transmission path 101 or 102) in the multipath signal transmission circuit 120 in the multi-channel manner. In addition, the CDR circuit 311 may provide a clock signal CLK(1) to the S2P circuit 312 and the multipath signal transmission circuit 120.

In an exemplary embodiment, in response to that the parallel signal transmission path 101 is turned on (i.e., the target parallel signal transmission path is the parallel signal transmission path 101), the signal S2 may be input to the parallel signal transmission path 101. The parallel signal transmission path 101 may transmit the signal S3 to the first input terminal of the multiplexer circuit 321 in the multi-channel manner according to the signal S2. The path control circuit 110 may turn on the first input terminal of the multiplexer circuit 321, and the multiplexer circuit 321 may transmit the signal S3 coming from the parallel signal transmission path 101 to the P2S circuit 322.

On the other hand, in response that the parallel signal transmission path 102 is turned on (i.e., the target parallel signal transmission path is the parallel signal transmission path 102), the signal S2 may be input to the parallel signal transmission path 102. The parallel signal transmission path 102 may transmit the signal S3 to the second input terminal of the multiplexer circuit 321 in the multi-channel manner according to the signal S2. The path control circuit 110 may turn on the second input terminal of the multiplexer circuit 321, and the multiplexer circuit 321 may transmit the signal S3 coming from the parallel signal transmission path 102 to the P2S circuit 322.

The P2S circuit 322 may receive the signal S3 from an output terminal of the multiplexer circuit 321 and perform sampling and speed up processing (i.e., frequency up-conversion) on the signal S3. For example, the P2S circuit 322 may restore the frequency of the signal S3 to be consistent with the original frequency of the signal S1 and output the frequency up-converted signal S4 via the driving circuit 323. In addition, the PLL circuit 324 may provide a clock signal CLK(2) to the multipath signal transmission circuit 120 and the P2S circuit 322.

It should be noted that, in the exemplary embodiment of FIG. 3, the signal S2 input to the parallel signal transmission path 101 and the signal S2 input to the parallel signal transmission path 102 have same frequency down-conversion amplitude (i.e., the same as each other). Therefore, a total number of the first parallel signal channels in the parallel signal transmission path 101 may be the same as a total number of the second parallel signal channels in the parallel signal transmission path 102, and/or the frequency of the signal transmitted through the parallel signal transmission path 101 may be the same as the frequency of the signal transmitted through the parallel signal transmission path 102.

Figure 4:
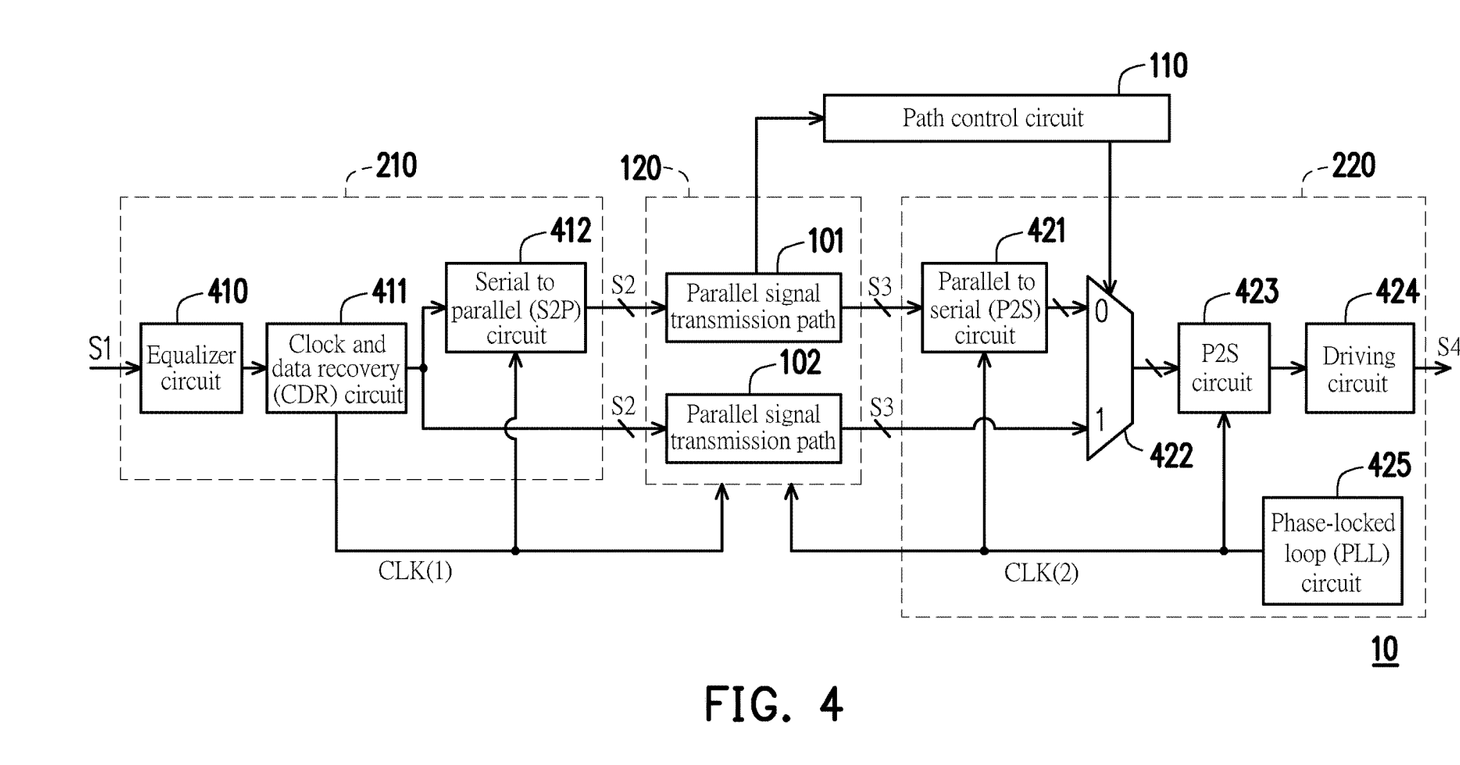
FIG. 4 is a schematic diagram of a retiming circuit module according to an exemplary embodiment of the invention.

FIG. 4 is a schematic diagram of a retiming circuit module according to an exemplary embodiment of the invention. Referring to FIG. 4, the signal receiving circuit 210 may include an equalizer circuit 410, a CDR circuit 411, and a S2P circuit 412. An output terminal of the equalizer circuit 410 is coupled to an input terminal of the CDR circuit 411. An output terminal of the CDR circuit 411 is coupled to an input terminal of the S2P circuit 412 and an input terminal of the parallel signal transmission path 102. An output terminal of the S2P circuit 412 is coupled to an input terminal of the parallel signal transmission path 101.

The signal output circuit 220 includes a P2S circuit (which is also referred to as a first P2S circuit) 421, a multiplexer circuit 422, and a P2S circuit (which is also referred to as a second P2S circuit) 423, a driving circuit 424 and a PLL circuit 425. An input terminal of the P2S circuit 421 is coupled to the output terminal of the parallel signal transmission path 101. An output terminal of the P2S circuit 421 is coupled to a first input terminal of the multiplexer circuit 422. An output terminal of the parallel signal transmission path 102 is coupled to a second input terminal of the multiplexer circuit 422. An output terminal of the multiplexer circuit 422 is coupled to an input terminal of the P2S circuit 423. An output terminal of the P2S circuit 423 is coupled to the driving circuit 424. The PLL circuit 425 is coupled to the P2S circuits 421 and 423.

An input terminal of the equalizer circuit 410 is used to receive the signal S1 and perform preliminary processing (such as signal amplification) on the signal S1. The equalizer circuit 410 may be the same or similar to the equalizer circuit 310 of FIG. 3. The CDR circuit 411 may receive the signal S1 through the equalizer circuit 410.

In response to that the parallel signal transmission path 101 is turned on (i.e., the target parallel signal transmission path is the parallel signal transmission path 101), the CDR circuit 411 and the serial conversion parallel circuit 412 may sequentially perform sampling and speed down processing on the signal S1. For example, after the speed down processing of the CDR circuit 411 and the S2P circuit 412, the frequency of the signal S2 output by the S2P circuit 412 may be ¼, ⅛, ¹⁄₁₆ or ¹⁄₃₂ of the original frequency of the signal S1, and the signal S2 may be input to the parallel signal transmission path 101. The parallel signal transmission path 101 may transmit the signal S3 to the P2S circuit 421 in the multi-channel manner according to the signal S2. At the same time, the path control circuit 110 may turn on the first input terminal of the multiplexer circuit 422. Through the first input terminal of the multiplexer circuit 422, the P2S circuits 421 and 423 may sequentially perform sampling and frequency up-conversion on the signal S3. For example, the P2S circuits 421 and 423 may cooperate to restore the frequency of the signal S3 to be consistent with the original frequency of the signal S1 and output the frequency up-converted signal S3 (i.e., the signal S4) through the driving circuit 424.

On the other hand, in response to that the parallel signal transmission path 102 is turned on (i.e., the target parallel signal transmission path is the parallel signal transmission path 102), the CDR circuit 411 may perform sampling and frequency down-conversion on the signal S1. For example, after the frequency down processing of the CDR circuit 411, the frequency of the signal S2 output by the CDR circuit 411 may be ½, ¼, ⅛ or ¹⁄₁₆ of the original frequency of the signal S1, and the signal S2 may be input to the parallel signal transmission path 102. The parallel signal transmission path 102 may transmit the signal S3 to the second input terminal of the multiplexer circuit 422 in the multi-channel manner according to the signal S2. Meanwhile, the path control circuit 110 may turn on the second input terminal of the multiplexer circuit 422. Through the second input terminal of the multiplexer circuit 422, the P2S circuit 423 may perform sampling and frequency up-conversion on the signal S3. For example, the P2S circuit 423 may restore the frequency of the signal S3 to be consistent with the original frequency of the signal S1 and output the frequency up-converted signal S4 through the driving circuit 424. In addition, the PLL circuit 425 may provide the clock signal CLK(2) to the multipath signal transmission circuit 120, the P2S circuit 421, and the P2S circuit 423.

It should be noted that, in the exemplary embodiment of FIG. 4, if the target parallel signal transmission path is the parallel signal transmission path 102 (i.e., the parallel signal transmission path 102 is turned on), the signal S1 will not be processed by the S2P circuit 412 and the P2S circuit 421. Only when the target parallel signal transmission path is the parallel signal transmission path 101 (i.e., the parallel signal transmission path 101 is turned on), the signal S1 may be processed by the S2P circuit 412 and the P2S circuit 421.

Namely, in the exemplary embodiment of FIG. 4, the signal S2 input to the parallel signal transmission path 101 and the signal S2 input to the parallel signal transmission path 102 have inconsistent (i.e., different) frequency down-conversion amplitudes. Therefore, the total number of first parallel signal channels in the parallel signal transmission path 101 may be different from the total number of second parallel signal channels in the parallel signal transmission path 102, and/or the frequency of the signal transmitted through the parallel signal transmission path 101 may be different from the frequency of the signal transmitted through the parallel signal transmission path 102. For example, in the exemplary embodiment of FIG. 4, the total number of second parallel signal channels in the parallel signal transmission path 102 may be less than the total number of first parallel signal channels in the parallel signal transmission path 101, and the frequency of the signal transmitted through the parallel signal transmission path 102 may be higher than the frequency of the signal transmitted through the parallel signal transmission path 101.

In the exemplary embodiments of FIG. 3 and FIG. 4, when the tolerance for signal transmission delay is higher (for example, during the handshake operation between the upstream device 11 and the downstream device 12), the retiming circuit module 10 may use more complicated circuits on the parallel signal transmission path 101 to analyze and/or process the signal transmitted between the upstream device 11 and the downstream device 12. In addition, when it is expected to reduce the signal transmission delay as much as possible (for example, when the handshake operation is finished and a data signal is started to be transmitted), the retiming circuit module 10 may use the parallel signal transmission path 102 with lower signal delay to speed up the signal transmission between the upstream device 11 and the downstream device 12. In this way, the signal transmission delay may be reduced as much as possible while extending a signal transmission distance.

It should be noted that the arrangement and coupling modes of all circuits in the retiming circuit module 10 mentioned in the aforementioned exemplary embodiment are only examples, and are not intended to limit the invention. In some exemplary embodiments, the arrangement and coupling modes of all circuits in the retiming circuit module 10 may be adjusted according to practical requirements. In addition, in some exemplary embodiments, more useful circuits and/or electronic components may be added to the retiming circuit module 10 or used to replace specific circuits and/or electronic components in the retiming circuit module 10 depending on practical needs.

It should be noted that the retiming circuit module 10 may include a combination of multiple sets of the path control circuit 110 and the multipath signal transmission circuit 120 to process and transmit signals of different transmission directions. For example, a combination of one set of the path control circuit 110 and the multipath signal transmission circuit 120 in the retiming circuit module 10 may be responsible for processing and transmitting the signal transmitted from the upstream device 11 to the downstream device 12, and a combination of another set of the path control circuit 110 and the multipath signal transmission circuit 120 in the clock reforming circuit module 10 is responsible for processing and transmitting the signal transmitted from the downstream device 12 to the upstream device 11.

Figure 5:
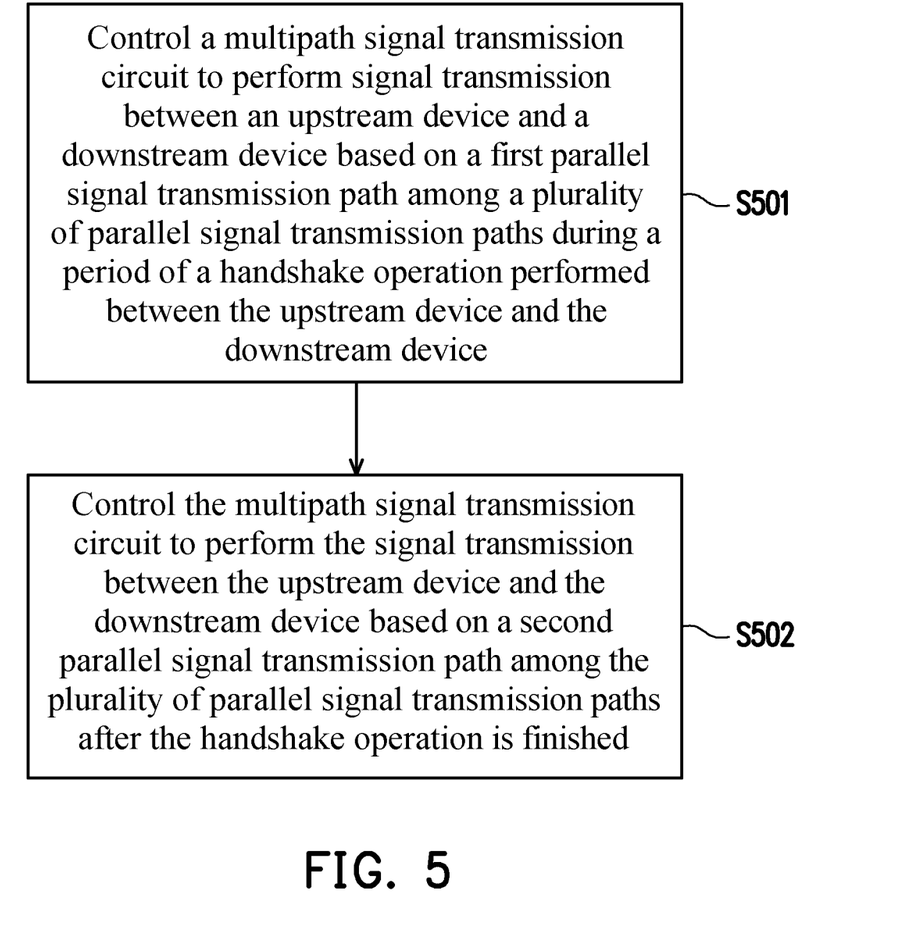
FIG. 5 is a flowchart of a signal transmission method according to an exemplary embodiment of the invention.

FIG. 5 is a flowchart of a signal transmission method according to an exemplary embodiment of the invention. Referring to FIG. 5, in step S501, during the handshake operation between the upstream device and the downstream device, the multipath signal transmission circuit is controlled to perform signal transmission between the upstream device and the downstream device based on the first parallel signal transmission path in the multiple parallel signal transmission paths. In step S502, after the handshake operation is finished, the multipath signal transmission circuit is controlled to perform signal transmission between the upstream device and the downstream device based on the second parallel signal transmission path in the multiple parallel signal transmission paths.

It should be noted that each step in FIG. 5 may be implemented as multiple program codes or circuits, which is not limited by the invention. In addition, the method in FIG. 5 may be used in collaboration with the above exemplary embodiments, or may be used alone, which is not limited by the invention.

In summary, the exemplary embodiments of the invention may dynamically switch different parallel signal transmission paths in the retiming circuit module in collaboration with specially designed frequency down and up conversion mechanisms according to tolerance changes in signal transmission delay under different usage situations, so as to perform signal transmission between the upstream device and the downstream device. In this way, the signal transmission delay may be reduced as much as possible while extending the signal transmission distance.

The previously described exemplary embodiments of the present invention have the advantages aforementioned, wherein the advantages aforementioned not required in all versions of the present invention.

It will be apparent to those skilled in the art that various modifications and variations can be made to the disclosed embodiments without departing from the scope or spirit of the invention. In view of the foregoing, it is intended that the invention covers modifications and variations provided they fall within the scope of the following claims and their equivalents.

What is claimed is:

1. A retiming circuit module, adapted to execute signal transmission between an upstream device and a downstream device, the retiming circuit module comprising:
    a path control circuit; and
    a multipath signal transmission circuit, coupled to the path control circuit,
    wherein the multipath signal transmission circuit comprises a plurality of parallel signal transmission paths,
    the path control circuit is configured to control the multipath signal transmission circuit to perform the signal transmission between the upstream device and the downstream device based on a first parallel signal transmission path among the plurality of parallel signal transmission paths during a period of a handshake operation performed between the upstream device and the downstream device, and
    the path control circuit is further configured to control the multipath signal transmission circuit to perform the signal transmission between the upstream device and the downstream device based on a second parallel signal transmission path among the plurality of parallel signal transmission paths after the handshake operation is finished,
    wherein the retiming circuit module further comprises:
    a signal receiving circuit, coupled to the multipath signal transmission circuit; and
    a signal output circuit, coupled to the multipath signal transmission circuit,
    wherein the signal receiving circuit is configured to receive a first signal and output a second signal,
    the path control circuit is further configured to turn on one of the plurality of parallel signal transmission paths as a target parallel signal transmission path,
    the multipath signal transmission circuit is further configured to receive the second signal from the signal receiving circuit and output a third signal based on the target parallel signal transmission path, and
    the signal output circuit is further configured to receive the third signal from the multipath signal transmission circuit and output a fourth signal.

2. The retiming circuit module as claimed in claim 1, wherein the handshake operation is configured to set a parameter of an equalizer of at least one of the upstream device and the downstream device.

3. The retiming circuit module as claimed in claim 1, wherein signal delay of the first parallel signal transmission path is higher than signal delay of the second parallel signal transmission path.

4. The retiming circuit module as claimed in claim 1, wherein the first parallel signal transmission path comprises a plurality of first parallel signal channels, the second parallel signal transmission path comprises a plurality of second parallel signal channels, and a total number of the plurality of first parallel signal channels is different from a total number of the plurality of second parallel signal channels.

5. The retiming circuit module as claimed in claim 1, wherein a frequency of a signal transmitted through the first parallel signal transmission path is different from a frequency of a signal transmitted through the second parallel signal transmission path.

6. The retiming circuit module as claimed in claim 1, wherein the path control circuit is further configured to detect start and end of the handshake operation performed between the upstream device and the downstream device.

7. The retiming circuit module as claimed in claim 1, wherein a frequency of the second signal is lower than a frequency of the first signal, and a frequency of the fourth signal is higher than a frequency of the third signal.

8. The retiming circuit module as claimed in claim 1, wherein during the handshake operation performed between the upstream device and the downstream device, the path control circuit turns on the first parallel signal transmission path as the target parallel signal transmission path, and
    after the handshake operation is finished, the path control circuit further switches to turn on the second parallel signal transmission path as the target parallel signal transmission path.

9. The retiming circuit module as claimed in claim 1, wherein the signal receiving circuit comprises:
    a clock and data recovery circuit; and
    a serial to parallel circuit,
    wherein an input terminal of the serial to parallel circuit is coupled to an output terminal of the clock and data recovery circuit,
    an output terminal of the serial to parallel circuit is coupled to an input terminal of the first parallel signal transmission path and an input terminal of the second parallel signal transmission path,
    an input terminal of the clock and data recovery circuit is configured to receive the first signal, and
    the output terminal of the serial to parallel circuit is configured to output the second signal.

10. The retiming circuit module as claimed in claim 9, wherein the signal output circuit comprises:
    a multiplexer circuit; and
    a parallel to serial circuit,
    wherein a first input terminal of the multiplexer circuit is coupled to an output terminal of the first parallel signal transmission path,
    a second input terminal of the multiplexer circuit is coupled to an output terminal of the second parallel signal transmission path,
    an output terminal of the multiplexer circuit is coupled to an input terminal of the parallel to serial circuit,
    one of the first input terminal and the second input terminal of the multiplexer circuit is configured to receive the third signal, and
    an output terminal of the parallel to serial circuit is configured to output the fourth signal.

11. The retiming circuit module as claimed in claim 1, wherein the signal receiving circuit comprises:
    a clock and data recovery circuit; and
    a serial to parallel circuit,
    wherein an output terminal of the clock and data recovery circuit is coupled to an input terminal of the serial to parallel circuit and an input terminal of the second parallel signal transmission path,
    an output terminal of the serial to parallel circuit is coupled to an input terminal of the first parallel signal transmission path,
    an input terminal of the clock and data recovery circuit is configured to receive the first signal, and
    one of the output terminal of the clock and data recovery circuit and the output terminal of the serial to parallel circuit is configured to output the second signal.

12. The retiming circuit module as claimed in claim 11, wherein the signal output circuit comprises:
    a first parallel to serial circuit;
    a second parallel to serial circuit; and a multiplexer circuit,
wherein an input terminal of the first parallel to serial circuit is coupled to an output terminal of the first parallel signal transmission path,
an output terminal of the first parallel to serial circuit is coupled to a first input terminal of the multiplexer circuit,
an output terminal of the second parallel signal transmission path is coupled to a second input terminal of the multiplexer circuit,
an output terminal of the multiplexer circuit is coupled to an input terminal of the second parallel to serial circuit,
one of the input terminal of the first parallel to serial circuit and the second input terminal of the multiplexer circuit is configured to receive the third signal, and
an output terminal of the second parallel to serial circuit is configured to output the fourth signal.

13. A signal transmission system, comprising:
an upstream device;
a downstream device; and
a retiming circuit module, coupled between the upstream device and the downstream device to perform signal transmission between the upstream device and the downstream device,
wherein the retiming circuit module comprises a plurality of parallel signal transmission paths,
the retiming circuit module is configured to perform the signal transmission between the upstream device and the downstream device based on a first parallel signal transmission path among the plurality of parallel signal transmission paths during a period of a handshake operation performed between the upstream device and the downstream device, and
the retiming circuit module is further configured to perform the signal transmission between the upstream device and the downstream device based on a second parallel signal transmission path among the plurality of parallel signal transmission paths after the handshake operation is finished,
wherein the retiming circuit module comprises:
a path control circuit;
a multipath signal transmission circuit, coupled to the path control circuit;
a signal receiving circuit, coupled to the multipath signal transmission circuit; and
a signal output circuit, coupled to the multipath signal transmission circuit,
wherein the multipath signal transmission circuit comprises the plurality of parallel signal transmission paths,
the signal receiving circuit is configured to receive a first signal and output a second signal,
the path control circuit is configured to turn on one of the plurality of parallel signal transmission paths as a target parallel signal transmission path,
the multipath signal transmission circuit is further configured to receive the second signal from the signal receiving circuit and output a third signal based on the target parallel signal transmission path, and
the signal output circuit is further configured to receive the third signal from the multipath signal transmission circuit and output a fourth signal.

14. The signal transmission system as claimed in claim 13, wherein the handshake operation is configured to set a parameter of an equalizer of at least one of the upstream device and the downstream device.

15. The signal transmission system as claimed in claim 13, wherein signal delay of the first parallel signal transmission path is higher than signal delay of the second parallel signal transmission path.

16. The signal transmission system as claimed in claim 13, wherein the first parallel signal transmission path comprises a plurality of first parallel signal channels, the second parallel signal transmission path comprises a plurality of second parallel signal channels, and a total number of the plurality of first parallel signal channels is different from a total number of the plurality of second parallel signal channels.

17. The signal transmission system as claimed in claim 13, wherein a frequency of a signal transmitted through the first parallel signal transmission path is different from a frequency of a signal transmitted through the second parallel signal transmission path.

18. The signal transmission system as claimed in claim 13, wherein the retiming circuit module is further configured to detect start and end of the handshake operation performed between the upstream device and the downstream device.

19. The signal transmission system as claimed in claim 13, wherein a frequency of the second signal is lower than a frequency of the first signal, and a frequency of the fourth signal is higher than a frequency of the third signal.

20. The signal transmission system as claimed in claim 13, wherein during the handshake operation performed between the upstream device and the downstream device, the path control circuit turns on the first parallel signal transmission path as the target parallel signal transmission path, and
after the handshake operation is finished, the path control circuit further switches to turn on the second parallel signal transmission path as the target parallel signal transmission path.

21. The signal transmission system as claimed in claim 13, wherein the signal receiving circuit comprises:
a clock and data recovery circuit; and
a serial to parallel circuit,
wherein an input terminal of the serial to parallel circuit is coupled to an output terminal of the clock and data recovery circuit,
an output terminal of the serial to parallel circuit is coupled to an input terminal of the first parallel signal transmission path and an input terminal of the second parallel signal transmission path,
an input terminal of the clock and data recovery circuit is configured to receive the first signal, and
the output terminal of the serial to parallel circuit is configured to output the second signal.

22. The signal transmission system as claimed in claim 21, wherein the signal output circuit comprises:
a multiplexer circuit; and
a parallel to serial circuit,
wherein a first input terminal of the multiplexer circuit is coupled to an output terminal of the first parallel signal transmission path,
a second input terminal of the multiplexer circuit is coupled to an output ten Anal of the second parallel signal transmission path,
an output terminal of the multiplexer circuit is coupled to an input terminal of the parallel to serial circuit,
one of the first input terminal and the second input terminal of the multiplexer circuit is configured to receive the third signal, and
an output terminal of the parallel to serial circuit is configured to output the fourth signal.

23. The signal transmission system as claimed in claim 13, wherein the signal receiving circuit comprises:

a clock and data recovery circuit; and
a serial to parallel circuit,
wherein an output terminal of the clock and data recovery circuit is coupled to an input WI Anal of the serial to parallel circuit and an input terminal of the second parallel signal transmission path,
an output terminal of the serial to parallel circuit is coupled to an input terminal of the first parallel signal transmission path,
an input terminal of the clock and data recovery circuit is configured to receive the first signal,
one of the output terminal of the clock and data recovery circuit and the output terminal of the serial to parallel circuit is configured to output the second signal.

24. The signal transmission system as claimed in claim 23, wherein the signal output circuit comprises:
a first parallel to serial circuit;
a second parallel to serial circuit; and
a multiplexer circuit,
wherein an input terminal of the first parallel to serial circuit is coupled to an output terminal of the first parallel signal transmission path,
an output terminal of the first parallel to serial circuit is coupled to a first input terminal of the multiplexer circuit,
an output terminal of the second parallel signal transmission path is coupled to a second input terminal of the multiplexer circuit,
an output terminal of the multiplexer circuit is coupled to an input terminal of the second parallel to serial circuit,
one of the input terminal of the first parallel to serial circuit and the second input terminal of the multiplexer circuit is configured to receive the third signal, and
an output terminal of the second parallel to serial circuit is configured to output the fourth signal.

25. A signal transmission method, adapted to a retiming circuit module, the signal transmission method comprising:
performing signal transmission between an upstream device and a downstream device based on a first parallel signal transmission path among a plurality of parallel signal transmission paths of the retiming circuit module during a period of a handshake operation performed between the upstream device and the downstream device; and
performing the signal transmission between the upstream device and the downstream device based on a second parallel signal transmission path among the plurality of parallel signal transmission paths after the handshake operation is finished,
wherein the retiming circuit module comprises:
a path control circuit; and
a multipath signal transmission circuit, coupled to the path control circuit,
a signal receiving circuit, coupled to a multipath signal transmission circuit; and
a signal output circuit, coupled to the multipath signal transmission circuit,
wherein the signal receiving circuit is configured to receive a first signal and output a second signal,
the path control circuit is further configured to turn on one of the plurality of parallel signal transmission paths as a target parallel signal transmission path,
the multipath signal transmission circuit is further configured to receive the second signal from the signal receiving circuit and output a third signal based on the target parallel signal transmission path, and
the signal output circuit is further configured to receive the third signal from the multipath signal transmission circuit and output a fourth signal.

* * * * *